United States Patent [19]

Clethero

[11] 4,127,199

[45] Nov. 28, 1978

[54] LIFTING APPARATUS

[75] Inventor: Percy A. Clethero, Gainford, England

[73] Assignee: Sparrows Contract Services Limited, Bristol, England

[21] Appl. No.: 781,192

[22] Filed: Mar. 25, 1977

[30] Foreign Application Priority Data

Jan. 25, 1977 [GB] United Kingdom ................ 2864/77

[51] Int. Cl.[2] ................................................ B65G 7/00

[52] U.S. Cl. .................................... 214/1 H; 52/122; 52/745; 214/1 Q; 214/146.5; 214/313; 254/144

[58] Field of Search .............. 214/1 R, 1 H, 318, 1 Q, 214/1 QE, 152, 146.5, 148, 3, 313; 212/7, 144; 29/155 R, 155 C; 52/116, 117, 119, 122, 745; 254/105, 108, 109, 110, 111, 139, 139.1, 144, 91, 94

[56] References Cited

U.S. PATENT DOCUMENTS

| | | | |
|---|---|---|---|
| 1,756,522 | 4/1930 | Paulson | 214/1 Q |
| 3,214,045 | 10/1965 | Dempster et al. | 214/505 |
| 3,620,395 | 11/1971 | Farmer, Sr. | 214/1 Q X |
| 3,638,375 | 2/1972 | Vasiliev et al. | 214/1 Q X |
| 3,994,475 | 11/1976 | Chambers | 254/108 |

FOREIGN PATENT DOCUMENTS

| | | | |
|---|---|---|---|
| 816,837 | 10/1951 | Fed. Rep. of Germany | 254/139.1 |
| 937,973 | 1/1956 | Fed. Rep. of Germany | 212/144 |
| 570,937 | 5/1924 | France | 298/12 |
| 430,048 | 11/1974 | U.S.S.R. | 254/139.1 |

*Primary Examiner*—Frank E. Werner
*Attorney, Agent, or Firm*—Olson, Trexler, Wolters, Bushnell & Fosse, Ltd.

[57] ABSTRACT

Heavy lifting gear for upending large heavy loads, comprising a crane for lifting one end of the load and a carriage for supporting the other end of the load, the carriage consisting of two bogies which can move along a track under the control of a stepping hydraulic ram. Each bogie has a bearing pivot and a frame attached to the lower end of the load with two co-operating bearing bosses, one at the lower corner and one at the center line of the load. During the first part of the lifting movement, the load rocks on the corner pivot and before it reaches the vertical the bearing elements on the center line engage.

6 Claims, 6 Drawing Figures

LIFTING APPARATUS

This invention relates to apparatus for handling large, heavy loads and is particularly though not exclusively applicable to apparatus for raising and upending a tall load such as a coke drum, pressure vessel, or factionating tower for an oil refinery.

BACKGROUND OF THE INVENTION

It is common practice to deliver such loads to the site in a horizontal attitude and then to raise and upend the load into a vertical position when it has reached the prepared site. A static crane, derrick, or gin pole lifting device is usually provided to raise one end of the load, and the other end is allowed to move horizontally in towards the prepared site or footing as the first end is raised. A difficulty however arises as the load approaches the vertical attitude, when it can become unstable, and there is a risk that it may get out of control. It is an object of the invention accordingly to provide an improved apparatus which will reduce this problem.

SUMMARY OF THE INVENTION

Broadly stated the invention aims to provide apparatus for use in handling large heavy loads comprising a carriage movable on a generally horizontal track, support means on said carriage providing two pivotal supports for a load, spaced apart in the direction of said track, means for adjusting the space between said supports, and means for controlling the movement of said carriage along said track.

The carriage conveniently includes two bogies, each carrying one of said supports, and preferably the apparatus includes motor means for moving the carriage horizontally. The motor may comprise a ground anchor connected to the carriage by a fluid operated ram or other power actuator, and means for selectively operating the anchor and the actuator to cause controlled stepping movements of the carriage.

According to a preferred feature of the invention the two supports are so arranged that as the load turns or rocks, when one support is engaged the other support is disengaged, except in a change-over position when both supports are temporarily engaged.

In any case, the parts are preferably so designed that the first support can be engaged adjacent a lower corner of the load, when the load is lying in one attitude and the second support will be engaged adjacent a vertical centre line through the centre of gravity of the load, when moved into another attitude. Preferably the weight of the load is transferred from one support to the other, before the centre of gravity of the load has moved to a position above the first support.

The apparatus is preferably provided in combination with a track on which the bogie(s) or movable carriage can travel, and also in combination with a crane, derrick, or other lifting gear capable of raising and turning the load from one attitude into another.

DESCRIPTION OF THE DRAWINGS

The invention may be performed in various ways and one specific embodiment with a number of possible modifications will now be described by way of example, with reference to the accompanying drawings, in which.

DESCRIPTION OF THE ILLUSTRATED EMBODIMENTS

Figure 4:
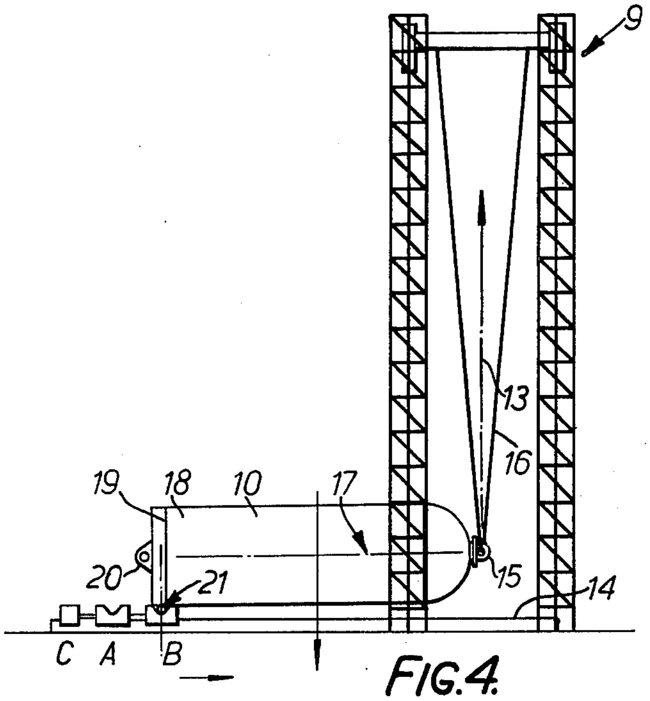
FIG. 4 is a diagrammatic side elevation on a reduced scale illustrating the first of a series or positions of a similar tall load being raised into a vertical attitude.
Figure 5:
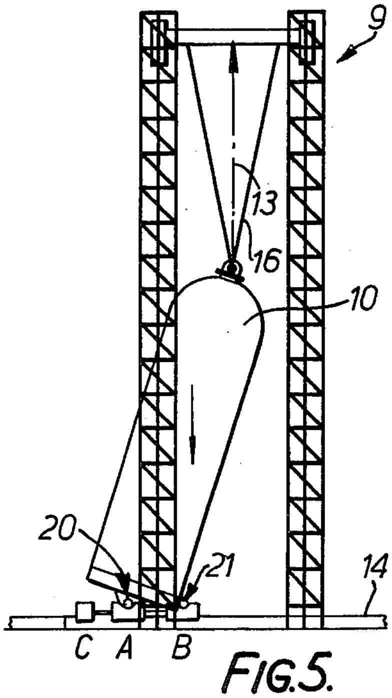
FIG. 5 is a similar view illustrating a second stage.
Figure 6:
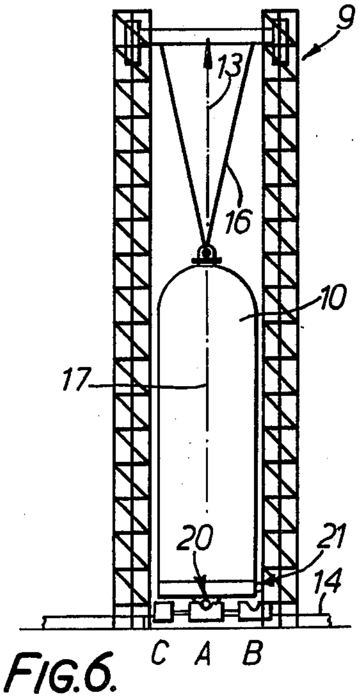
FIG. 6 is a similar view illustrating the final stage.

Referring first to FIGS. 4 to 6, the load in this example is a tall pressure vessel or chemical treatment tower 10 which is generally cylindrical in shape and may have a height of 30 to 40 meters. The vessel is delivered to the site in a horizontal attitude as illustrated in FIG. 4, and the purpose of the operation then is to upend the vessel into a vertical attitude on a pre-prepared concrete plinth. The main lifting function for the upending is performed by a static crane, derrick or the like 9, having lifting cables and tackle 16 positioned on a vertical line 13 passing through the centre of the prepared site on the plinth.

Before the upending operation starts a pair of rail tracks 14 are laid across the plinth so as to extend a considerable distance to one side, as illustrated in FIG. 4, the tracks being securely anchored to the ground. The lifting gear 16, is then attached to a point 15 at the centre of the top of the vessel and therefore lying on the centre line 17 of the vessel. The lower end 18 of the vessel is secured in a frame 19 which is provided with two spaced bottom pivots, the pivot 20 being positioned on the centre line 17 while the pivot 21 is positioned at the bottom corner.

This lower corner pivot 21 is initially located in a bogie B which can move along the track 14, and the bogie B is connected to another bogie A carrying a saddle to receive the first pivot or spigot 20 when the vessel has been nearly fully upended. The two bogies are moved inwards towards the vertical centre line 13 by means of a stepping jack C.

The upending operation starts by hoisting on the lifting gear to raise the top point 15 of the pressure vessel, and as this lifting proceeds the lower end of the vessel is moved in towards the centre line 13 by means of the stepping jack C, as illustrated in FIG. 5 and FIG. 6. FIG. 5 illustrates diagrammatically the forces acting on the vessel when its centre of gravity has been raised to a position nearly over the corner pivot 21. In this position the weight acting through the centre of gravity and the vertical reaction through the pivot 21 are nearly in line, and the vessel in this condition would be basically in an unstable state. If it should rock past this position the lifting point 15 would actually rise in relation to the pivot 21 and this would tend to slacken the hoisting cables. In other words, the lifting cables at this point are not capable of properly controlling further movement of the vessel. In accordance with the invention however the second pivot 20 is arranged to engage the bogie A when the vessel reaches the position illustrated in FIG. 5, and this restores the stability of the system. Hoisting by means of the lifting gear can therefore continue safely beyond this position, the lower end of the vessel being supported on the central pivot 20, while the corner pivot 21 has disengaged from the bogie B. As the pressure vessel moves into its final vertical attitude as shown in FIG. 6 the weight of the vessel acting through its centre of gravity comes into line with the reaction force through the central pivot 20, and the vertical lift at the point 16 also moves into this same vertical line, but there is this important difference that the load is then in a stable condition. Any tendency to move beyond the vertical will be immediately checked by the lifting gear, and the risk of instability is much reduced.

Figure 1:
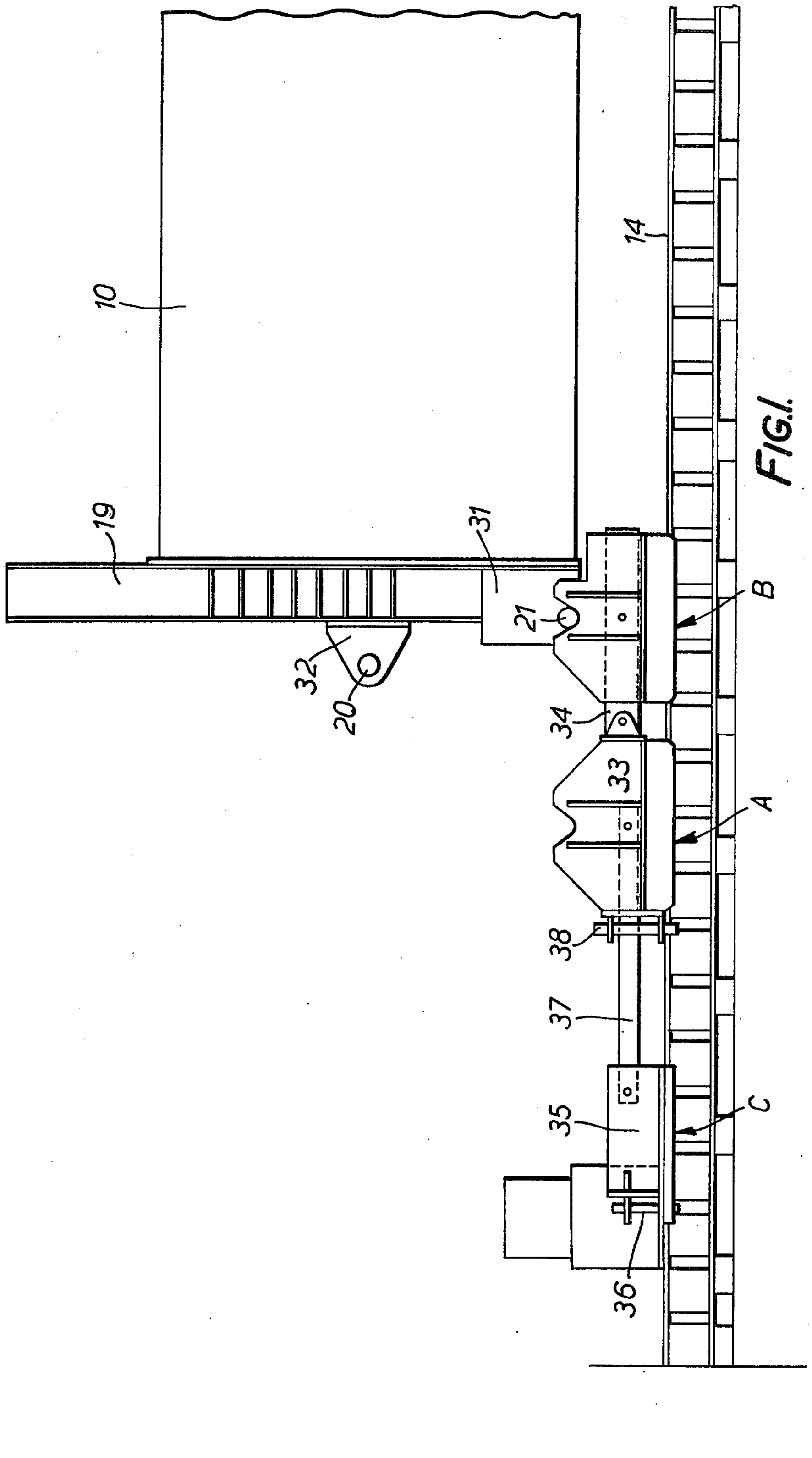
FIG. 1 illustrates the first stage in the raising of a tall pressure vessel from a horizontal to a vertical attitude, the drawing being a somewhat diagrammatic side elevation illustrating the equipment provided at the base of the vessel.
Figure 2:
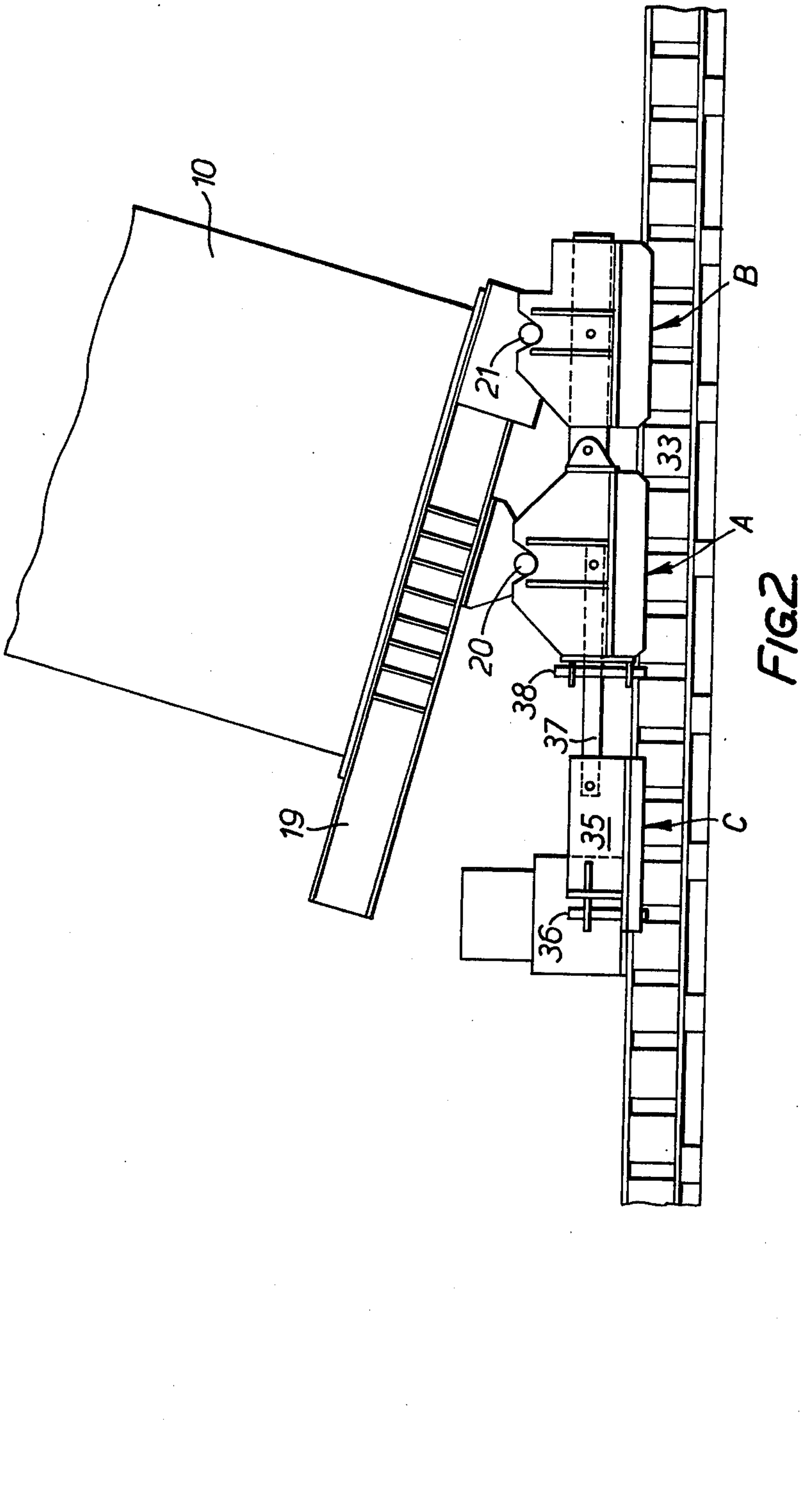
FIG. 2 2 is a similar view illustrating a second stage.
Figure 3:
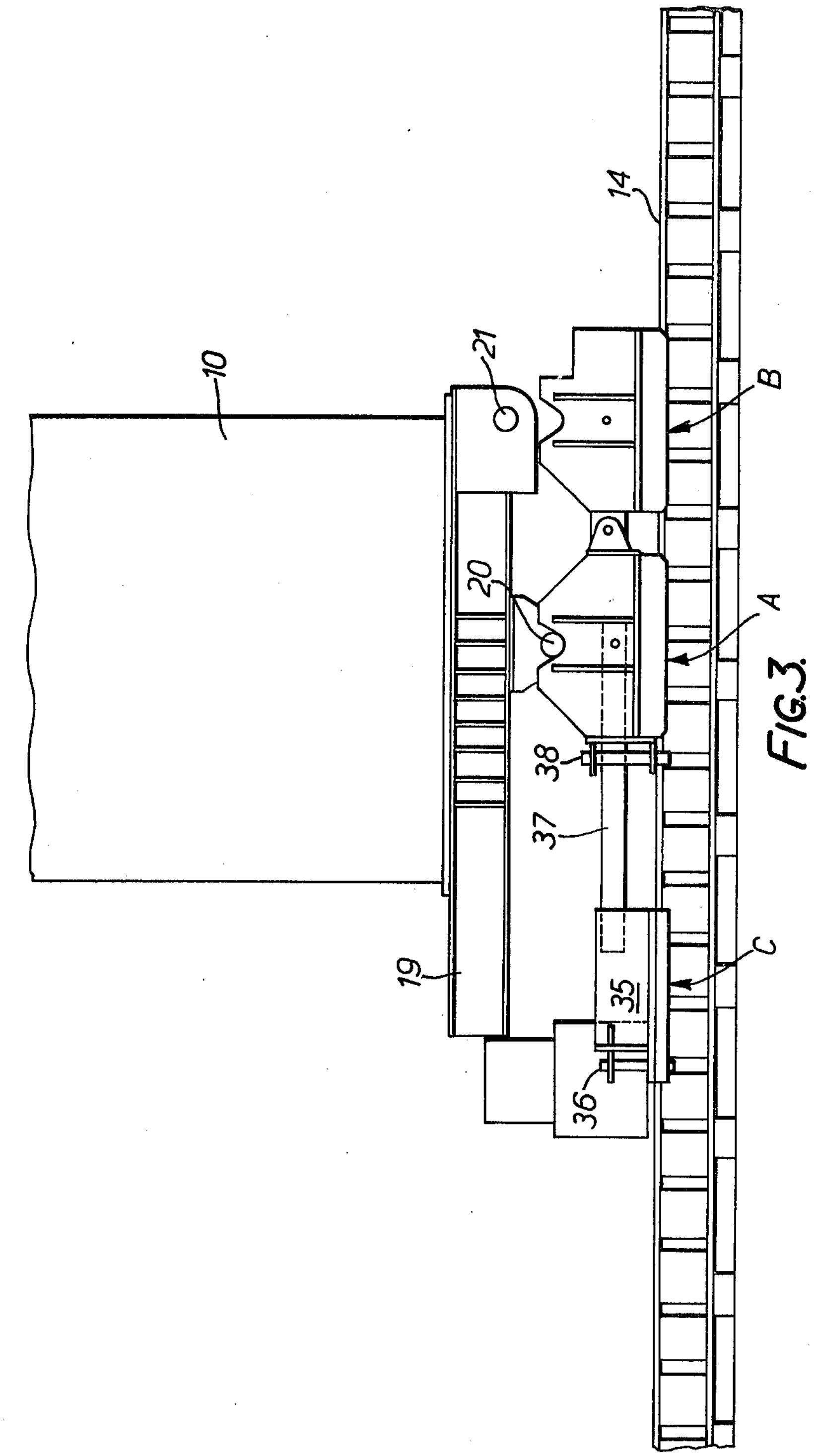
FIG. 3 3 is a similar view illustrating the third or final stage.

FIGS. 1 to 3 illustrate somewhat diagrammatically but in more detail a particular practical embodiment of the so-called "tailing" gear provided at the lower end of the pressure vessel. Referring first to FIG. 1, in which like parts are referred to by the same reference numerals, it will be seen that a frame 19 is provided at the bottom end of the vessel, consisting of two side members which are cross-connected so that they can be fitted to vessels of different sizes. A corner bracket 31 is connected to these two side pieces to locate the corner pivot 21. A further pair of saddles 32 are adjustably positioned on the frame 19 to locate the central pivot trunnions 20, one on each side of the frame.

The rail track 14 is laid on sleepers or other supports, and securely anchored in position, but the upper flange of the track rail is notched at spaced intervals for use with the stepping jack. The two bogies A and B are each provided with "roller skates" to engage the track rails 14 and each has a pair of saddles in its upper profile to receive and locate the two pivot shafts 20,21. The bogies A,B are also adjustably interconnected by means of a telescoping adjustment device 34 and a hinge pin 33. This allows the two saddles on the bogies to be adjusted horizontally into the same relative position as the gap between the two pivots 20,21. This gap is important and critical to ensure that the centre pivot 20 will engage the saddle of bogie A before the centre of gravity of the vessel has reached a position vertically above the pivot 21 as previously explained with reference to FIG. 5.

The stepping jack comprises a slide 35, also movable on the track 14, and having a movable vertical anchorage bolt 36 which can be moved downwards to engage in one of the spaced notches in the track rail. The slide 35 is connected to the rear bogie A by means of a high pressure hydraulic jack or cylinder 37, and this bogie A also has a similar vertical anchorage bolt 38 to engage wtih the track rail. To operate the stepping jack the slide 35 is anchored to the rail by means of the bolt 36, the locking bolt 38 on bogie A is raised and the jack 37 is extended to move the two bogies A,B, along the rail. When the bogies have reached the end of this step the locking bolt 38 on bogie A is engaged with the rail, the other bolt 36 is raised, and the jack 37 is retracted to bring the sledge 35 up towards the rear bogie A. The process is then repeated, and carefully controlled to maintain the lifting point 15 on the vertical lifting line 13.

FIGS. 2 and 3 illustrate the same components in different stages of the upending operation. In FIG. 3 the vessel has been lifted to a position in which the centre pivot 20 has just engaged in the rear bogie saddle A. Subsequently as shown in FIG. 3, the vessel is raised to its vertical position directly over the centre pivot 20, while the corner pivot 21 has disengaged from the saddle of bogie B.

It will be appreciated that the bearing pivots 20,21 and the saddles in bogies A,B, may take various different forms. By reversing the parts the trunnions may be provided on the bogies with saddles attached to the load to be raised. Alternatively, both lower bearing elements may be provided on a common bogie or carriage, with means for relative adjustment to suit the adjustment between the two bearing elements attached to the load. Instead of the stepping hydraulic jack 35,36 various other methods of moving the lower end of the vessel inwards may be substituted, such as a heavy duty winch, or a type of crawler tractor. Theoretically the same results can be achieved by leaving the bogie bearing carriages stationary and moving the lifting mechanism for the other end of the vessel. However, in practice it is preferred to adopt the system described above.

It will also be understood that in certain circumstances it may be desirable to have three or even more spaced bearing pivots at the lower end of the vessel to be upended, so that the bearings or pairs of bearing elements engage and disengage in sequence as the vessel is progressively upended.

I claim:

1. Apparatus for use in raising and tilting a large elongated heavy load having a major length axis, from a generally horizontal attitude to a generally vertical attitude, comprising a carriage movable along a generally horizontal track, support means on said carriage providing two pivotal bearing supports for the load, said supports being spaced apart in the direction of said track, means for controlling the movement of said carriage along said track, and a rocking cradle provided with means for attachment to an end of the load and having two corresponding pivot bearings spaced apart the same distance in a direction transverse to the major length axis of said load, one of said pivot bearings being adjacent a bottom corner of the load when horizontal and the other pivot bearing being positioned adjacent the major length centreline of the load, whereby when the load is approximately horizontal the first said pivot bearing engages a first one of said two pivotal supports on said carriage, in an inclined position of the load both of said bearings engage said two pivotal supports, and in a vertical position of the load the second said pivot bearing engages the second said pivotal support on the carriage and the said first bearing is disengaged from the first pivotal support.

2. Apparatus according to claim 1, wherein the carriage includes two bogies, each carrying one of said supports.

3. Apparatus according to claim 1, including motor means for moving the carriage horizontally along said track.

4. Apparatus according to claim 3, in which said motor means includes a fluid operated stepping power actuator connected to said carriage and to a ground anchor also movable along said track and having means for selectively clamping and unclamping said anchor from said track, and means for selectively operating said anchor and said actuator to cause controlled stepping movements of said carriage along said track.

5. Apparatus according to claim 1, in which the pivot bearings and supports are so positioned that the weight of the load is transferred at least partly from one support to the other, before the centre of gravity of the load has moved to a position above the first support.

6. Apparatus according to claim 1, in combination with a heavy vertical lifting gear, positioned above said track.

* * * * *